E. P. MAYHEW.
AIRLESS TIRE FOR AUTOMOBILES.
APPLICATION FILED AUG. 30, 1917.
1,251,077. Patented Dec. 25, 1917.
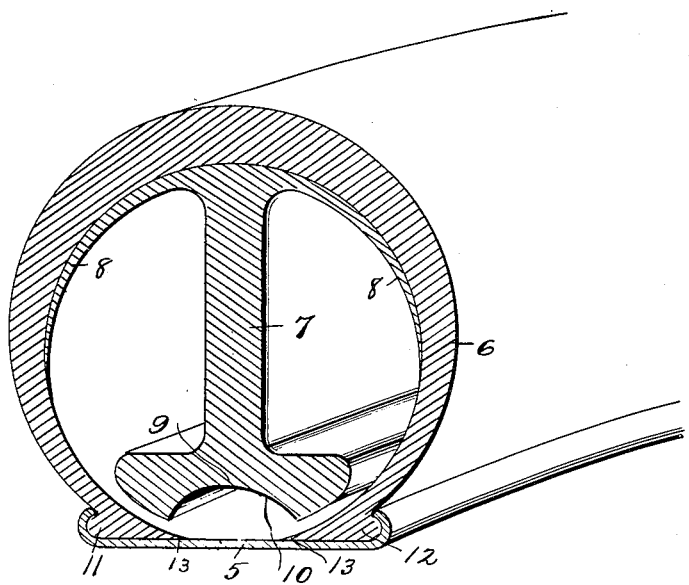
Inventor
Earl P. Mayhew
By Shepherd Campbell
Attorneys

UNITED STATES PATENT OFFICE.

EARL P. MAYHEW, OF SAN DIEGO, CALIFORNIA.

AIRLESS TIRE FOR AUTOMOBILES.

1,251,077. Specification of Letters Patent. Patented Dec. 25, 1917.

Application filed August 30, 1917. Serial No. 188,920.

*To all whom it may concern:*

Be it known that I, EARL P. MAYHEW, a citizen of the United States of America, residing at San Diego, in the county of San Diego and State of California, have invented certain new and useful Improvements in Airless Tires for Automobiles, of which the following is a specification.

This invention relates to an airless cushion tire for vehicles, and it has for its object to provide an improved device of this character constructed in such manner as to effectively cushion a motor vehicle such as an automobile without rendering it necessary to maintain the tire casing under air pressure, while at the same time the entire structure will be held in secure engagement with the rim to which it is applied.

Further objects and advantages of the invention will be set forth in the detailed description which now follows.

The figure shown in the accompanying drawing is a sectional perspective view of a tire constructed in accordance with the invention.

Referring to the drawing the numeral 5 designates a rim to which the tire is adapted to be applied. As is clearly illustrated in the drawing it is not necessary to provide a special type of rim in order to use the tire constituting the present invention, but upon the contrary this improved tire may be readily applied to clencher rims, already well known and in wide use, and as this description proceeds it will be seen that the tire structure is such as to maintain the tire in efficient engagement with such rims.

The tire comprises an outer casing 6 which may be of rubber or any other suitable flexible material. Secured to the inner surface of the casing 6 is a central web or rib 7 of leather having wings 8 by means of which it is firmly affixed to the casing 6 over such a wide area as to insure that it will be firmly united with the casing 6. At its bottom or inner edge the rib 7 is provided with a web 9, which extends crosswise of the tire, and has a concave lower face 10. The edges of the casing 6 are provided with beads 11 and 12 of a usual and well known construction, adapted to engage the clencher rim 5 in a usual and well known way. The width of the lower face of web 9 is such that its extremities overlap the edges 13 of the tire casing. Consequently when load is brought upon the tire and the leather rib is forced toward the rim, the web engages the casing and holds it upon the rim. The concavity 10 cushions the downward movement of the rib and results in an outward thrust being given the portions of web 9 which engage the beads 11 and 12, whereby the casing is held securely to the rim and additional resiliency is secured.

It is to be understood that the invention is not limited to the precise construction set forth, but that it includes within its purview whatever changes fairly come within the spirit of the appended claims.

Having described my invention what I claim is:

1. A tire of the character described, comprising a central rib having a transverse web at the inner edge thereof, said web having a concave inner face which overlies adjacent portions of the casing.

2. A tire of the character described, comprising a flexible body portion, a centrally disposed leather web having wings extending in opposite directions therefrom, which wings are secured to the flexible body portion, and which rib has a transverse web at its inner edge, said web having a curved inner face including a concave portion in the width thereof which overlies adjacent portions of the casing.

3. A tire of the character described, comprising a casing having beads for engagement with a clencher rim and terminating in sharply tapered edges spaced from each other, to thereby leave an exposed portion of the rim between them, a central rib and a transverse web at the inner edge of said rib said web having a curved inner face, and a concave portion in the width thereof.

4. A tire of the character described, comprising a casing having beads for engagement with a clencher rim, a leather rib centrally disposed within said casing, and extending continuously therearound, wings extending in opposite direction from said rib and lying in contact with and secured to the inner walls of the casing, a transverse web located at the inner edge of the said rib, said web having a convexly curved inner surface, and a concave portion in the width thereof, and the casing being of such dimensions and so shaped as to provide sharply tapered portions at the opposite sides thereof, said curved inner face of the web overlying the adjacent portions of the casing.

In testimony whereof I affix my signature.

EARL P. MAYHEW.

Witnesses:
J. C. HIZAR,
E. M. McDONALD.